United States Patent [19]
Mitsuta

[11] Patent Number: 5,732,535
[45] Date of Patent: Mar. 31, 1998

[54] METHOD FOR PACKAGING ARTICLE UTILIZING ATMOSPHERIC PRESSURE AND PACKAGING DEVICE

[75] Inventor: Teruo Mitsuta, Chiba, Japan

[73] Assignee: Shinwa Corporation, Chiba, Japan

[21] Appl. No.: 791,544

[22] Filed: Jan. 31, 1997

Related U.S. Application Data

[63] Continuation of Ser. No. 448,781, May 24, 1995, abandoned.

[51] Int. Cl.⁶ .................................................. B65B 31/00
[52] U.S. Cl. ............................... 53/512; 53/510; 53/566
[58] Field of Search .......................... 53/432, 434, 447, 53/510, 427, 512, 556, 557

[56] References Cited

U.S. PATENT DOCUMENTS

| | | | |
|---|---|---|---|
| 3,000,418 | 9/1961 | Bitting | 53/434 |
| 3,181,699 | 5/1965 | Armentrout | 53/427 |
| 3,429,095 | 2/1969 | Huson | 53/434 |
| 3,508,375 | 4/1970 | Myers | 53/512 |
| 4,164,109 | 8/1979 | Dubois | 53/427 |
| 4,562,689 | 1/1986 | Hannen | 53/434 |
| 4,575,989 | 3/1986 | Hannen | 53/512 |
| 4,756,140 | 7/1988 | Gannon | 53/434 |

FOREIGN PATENT DOCUMENTS

| | | | |
|---|---|---|---|
| 2 406 567 | 5/1979 | France | |
| 2446771 | 9/1980 | France | 53/434 |

*Primary Examiner*—Daniel Moon
*Assistant Examiner*—Ed Tolan
*Attorney, Agent, or Firm*—Nikaido, Marmelstein, Murray & Oram LLP

[57] ABSTRACT

The invention provides a device for packaging an article which includes reduced number of parts, which is lightweight, which enables simple packaging and depackaging operation, and which is superior in terms of rust-proofing and dust-proofing properties. The invention also provides a method for packaging an article. According to the invention, an article 1 is placed on a base table 2 having a peripheral wall 7 of an appropriate height. A packaging sheet 3 having flexibility and air-tightness is put over the article 1. The peripheral edge 3a of the packaging sheet 3 is sealingly engaged with the peripheral wall 7 of the base table 2. A connection pipe 10 provided at the base table 2 or the packaging sheet 3 is connected to a vacuum pump 12, so as to evacuate the space within the packaging sheet 3. The article 1 is pressingly urged against the base table 2 by means of the pressure difference across the packaging sheet 3, by reason of the atmospheric pressure, so as to be fixed to the base table 2.

4 Claims, 5 Drawing Sheets

1

METHOD FOR PACKAGING ARTICLE UTILIZING ATMOSPHERIC PRESSURE AND PACKAGING DEVICE

This application is a continuation of application Ser. No. 08/448,781 filed May 24, 1995, now abandoned.

TECHNICAL FIELD

This invention relates to a method for packaging an article utilizing atmospheric pressure, and a packaging device.

BACKGROUND OF THE INVENTION

Various kinds of methods or devices are known by which a variety of articles are packaged and transported. Since it is difficult for a large-sized article to be packaged, a packaging vessel such as a container is used in which panel members of a steel plate or wooden material are combined to form a box-like configuration.

With such a packaging container, it is unnecessary for an article to be packed. Depending upon a particular article, very troublesome packing procedure is conventionally required, in order to avoid the article from rusting or damaging. A large-sized, rusty article, such as sheet material or coiled material for the purpose of press working, is securely packaged in its entirety by a packaging paper having rust-proofing and moisture-proofing properties, so as not to be exposed to the exterior, in order to avoid it becoming rusty and damaged. The portion of the article tending to be easily damaged due to external impact is covered with a protective pad. The thus formed package is bound by a binding band in its entirety and contained in a package container for transpiration purpose. In order to transport a large-sized panel member, such as a door panel or a fender panel of an automobile, a plurality of such panels are arranged in a packaging container in a vertical orientation and spaced apart relationship, in order to avoid them from being damaged. The panels are fixed by an appropriate means so as to avoid them from falling down to be contacted relative to one another.

In the case of a metal article, it is necessary to provide various countermeasures, in order to avoid it from becoming rusty and/or to avoid it from being damaged during transportation. Thus, it is very time-consuming to conduct packaging operation or depackaging operation. It also requires well-trained operator. A large quantity of packing material is also required, so that an increased amount of packing material is produced after depackaging, which is very problematic. It also requires a large-scale, heavy weight packaging container which is troublesome in view of handling.

A de-constructive packaging container is known. The de-constructive packaging container is so configured that it may be broken into parts after storage or depackaging in a compact form. It is still massive and heavy even after it is deconstructed.

SUMMARY OF THE INVENTION

Accordingly, it is an object of the invention to provide a packaging device and method which permit very easy packaging operation and depackaging operation, and which provide superior rust-proofing ability and fixation ability relative to an article to be packaged.

The invention provides a method and device for packaging an article utilizing atmospheric pressure by the steps of: placing an article on a base plate; putting a packaging sheet on the article, the packaging sheet having flexibility and air-tightness; sealingly attaching the peripheral edge of the packaging sheet to the peripheral wall of the base plate; reducing the pressure in the space enclosed with the base plate and the packaging sheet to a pressure below the atmospheric pressure; and permitting the atmospheric pressure to be acted on the article through the packaging sheet; whereby the article is fixedly urged against the base table by the action of the atmospheric pressure.

It is sufficient for the base table to have a peripheral wall of a size sufficient to enable the article to be mounted thereon and to enable the peripheral edge of the packaging sheet to be sealingly engaged therewith. The base table may be of a flat plate having an appropriate thickness, a bottom wall of a reduced thickness having a peripheral wall upstanding from the bottom wall, or a hollow, box-like configuration.

The packaging sheet is formed from a resilient sheet material having air-tightness and flexibility for enabling the packaging sheet to be flexed along the contour of the article during evacuation process. The packaging sheet is formed from a sheet material having a uniform thickness in its entirety, or a sheet material having a peripheral edge of an increased thickness. The packaging sheet has a size and configuration enabling the base table and the article thereon to be covered therewith.

The packaging sheet and the base table may be configured so that the peripheral edge of the packaging sheet is sealingly placed over the base table. Alternatively, it is possible to provide a band at the outer periphery of the packaging sheet, so that the peripheral edge may be urged against the base table in an airtight manner. In another embodiment, the peripheral edge of the packaging sheet may be bonded directly to the base table by means of adhesive means. It is also possible for the packaging sheet to be sealingly engaged with another sealable seat, so that it is engaged with the base table in an airtight manner during evacuation process.

The vacuum connection means serves to connect the space around the article enclosed by the packaging sheet and the base table to a vacuum source. The vacuum connection means includes a connection pipe provided with a gate valve. The connection pipe is attached to the base table or the packaging sheet. The connection pipe is connected with the vacuum source during packaging operation. By this, the space within the packaging sheet is evacuated to a decreased pressure. The connection pipe also serves to introduce a quantity of air into the space within the packaging sheet during depackaging process.

In accordance with the invention, it is possible to package an article in a quite simple manner wherein an article is placed on the base table, the packaging sheet is put over the article, the peripheral edge of the packaging sheet is sealingly engaged with the peripheral wall of the base table, and the space within the packaging sheet is evacuated by means of the vacuum connection means. The article may be prevented from rusting, since the air in the space within the packaging sheet has been removed.

When the space within the packaging sheet is evacuated, the atmospheric pressure outside the package is acted uniformly on the packaging sheet, so that the entire article is urged against the base table by means of the uniform pressure and fixed thereon. Accordingly, the article, no matter whether it is consisted of a single part or a plurality of individual parts, may be securely fixed on the base table, without the use of any additional means, such as binding band or tape.

BEST MODE FOR CARRYING OUT THE INVENTION

Several embodiments of the invention will be explained in detail below with reference to FIGS. 1 through 11.

Figure 1:
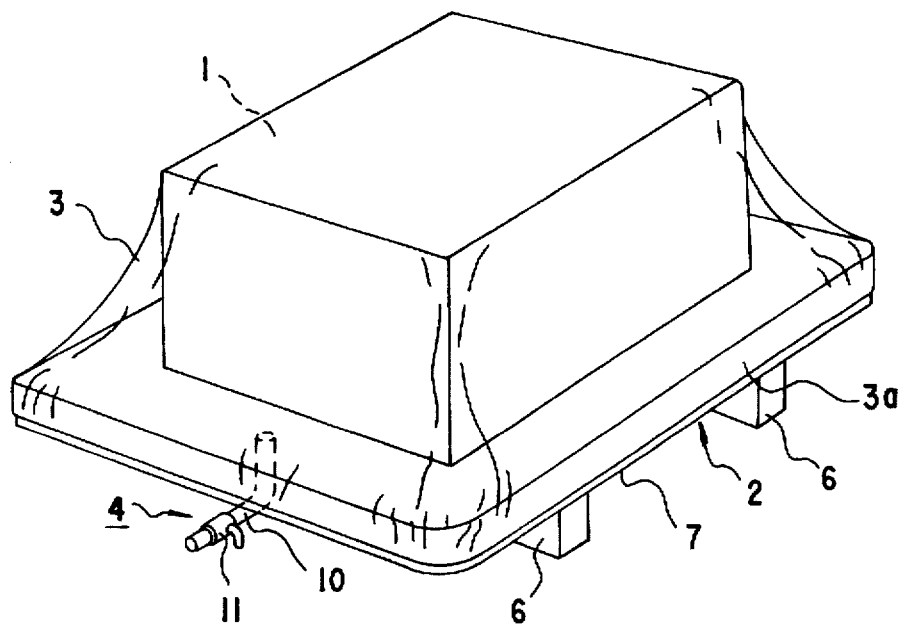
FIG. 1 is a perspective view of a packaging device according to one embodiment of the invention.
Figure 2:
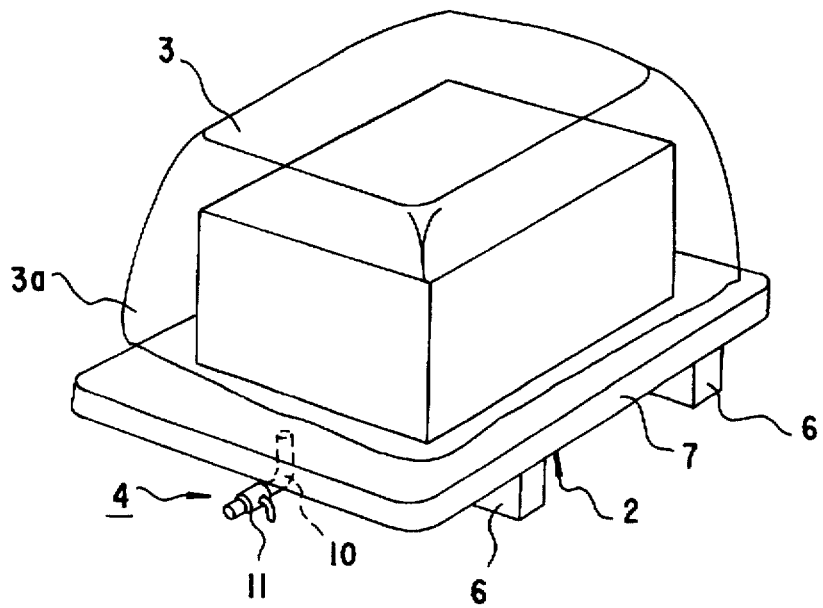
FIG. 2 is a perspective view of the packaging device of FIG. 1 upon actuation.
Figure 3:
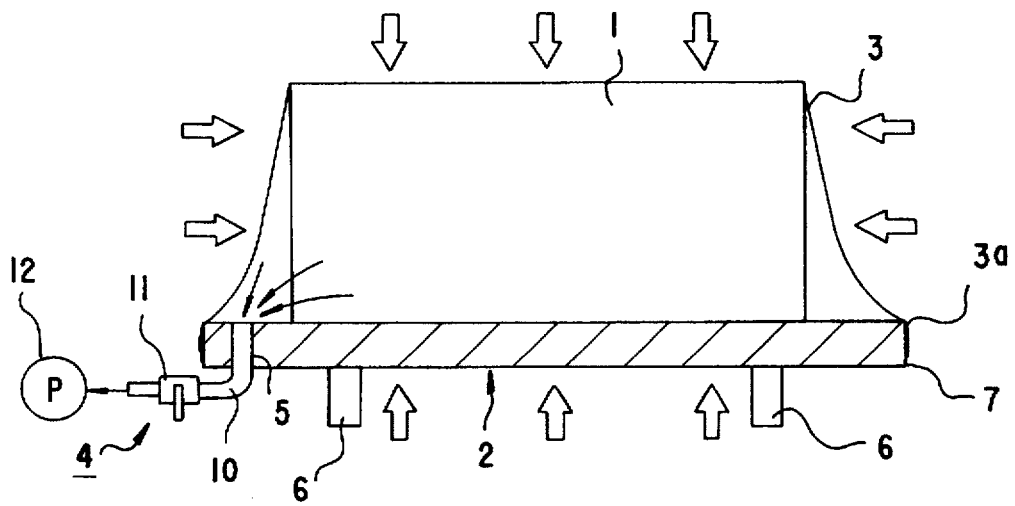
FIG. 3 is an elevational view, in section, of the packaging device of FIG. 1.

A packaging device utilizing atmospheric pressure comprises, as shown in FIGS. 1 through 3, a base table 2 on which an article 1 is mounted, a packaging sheet 3 for covering the article 1, and connection means 4 in communication with a vacuum source for reducing the pressure within a space enclosed by the packaging sheet 3 and the base table 2, so as to maintain a reduced pressure within the space.

The base table 2 may be made from a flat plate of a material, such as, metals, woods, or synthetic resins. The flat plate should have a surface substantially larger than that of the article 1, and a mechanical strength sufficient to withstand a load or weight of the article 1. The base table 2 has a thickness for enabling the peripheral edge 3a of the packaging sheet 3 to be closely adhered thereon. The base table 2 defines, in a portion thereof, an attachment bore 5 to which the vacuum connection means 4 is to be attached. The base table 2 is provided with legs 6 attached to the lower surface thereof, in order to maintain a space into which a fork of a fork lift may be inserted during transportation, and a space in which the vacuum connection means 4 is disposed.

The packaging sheet 3 is formed from a sheet material having an air-tightness and suitable elasticity. In actual, the packaging sheet is formed from a plastic sheet such as a vinyl sheet, a rubber sheet, or a fabric sheet lined with a rubber layer or coated with plastic material. The packaging sheet 3 is of a uniform thickness in its entirety. In this connection, it is noted that, since the packaging sheet does not require a high strength, it may have a thinner thickness, provided that it is capable of withstanding a certain degree of tension and of maintaining air-tightness during evacuation or vacuum operation. The packaging sheet 3, being formed from the above sheet material, is formed into a substantially sack-like configuration one side of which is opened so as to define an opening. The peripheral edge 3a around the opening of the packaging material having been formed into a sack-like configuration has a peripheral length shorter than that of the peripheral wall 7 of the base table 2. Thus, the packaging material of a sack-like configuration is mounted to the peripheral wall 7 of the base table, with the peripheral edge 3a being slightly extended.

The vacuum connection means 4 includes a connection pipe 10. One end of the connection pipe 10 is inserted in the attachment bore 5 of the base table 2 and opened at the upper surface of the base table 2. The other end of the connection pipe 10 is removably connected to a vacuum pump 12. The vacuum connection means also includes a gate valve 11 disposed between the opposite ends of the connection pipe.

In operation, the article 1 is placed onto the base table 2. Then, the packaging sheet 3 is put on the article 1. The peripheral edge 3a of the packaging sheet 3 is tightly placed around the peripheral wall 7 of the base table 2. Thereafter, the gate valve 11 is opened, and then the vacuum pump 12 is actuated. By this, a quantity of air contained within a space defined by the base plate 2 and the packaging sheet 3 is evacuated, so that the pressure within the space is reduced to a pressure below the atmospheric pressure. Thus, the entire packaging sheet 3 is uniformly urged against the article 1 due to the pressure difference across the packaging sheet 3. Accordingly, the article 1 is urged, through the packaging sheet 3, against the upper surface of the base table 2, so as to be fixed thereon. After this fixation of the article, the gate valve 11 is closed, so as to maintain the space within the packaging sheet 3 at an evacuated condition or a reduced pressure. Then, the connection pipe 10 is disconnected from the vacuum pump 12, whereby the packaging operation is completed.

The atmospheric pressure, to be acted on the article 1 due to the evacuated condition within the packaging sheet 3, is evenly or uniformly applied to the article 1 in every direction, as shown by the arrow marks in FIG. 3. The laterally opposed components of the atmospheric pressure are acted on relative one another, so as to be counterbalanced. The vertically opposed components of the atmospheric pressure are acted on the article 1 and the base table 2, respectively, in opposite directions. Thus, the article 1 is urged against the base table 2 so as to be fixed thereon, whereby any lateral displacement or shift of the article is prevented.

When the space within the packaging sheet is completely evacuated, a pressure of 1 kgf/square cm may be applied to the packaged article. Thus, the article may be securely fixed even when it is of a heavier weight. In this connection, it is unnecessary for the space within the packaging sheet 3 to be completely evacuated upon packaging. Rather, the degree of vacuum may be adjustably selected, so as to obtain a pressure sufficient to fix the article. Particularly when the article has a lesser strength, the degree of vacuum should be selected accordingly. In such a case, a pressure gauge or vacuum gauge (not shown) is connected to the connection pipe 10, so as to enable one to adjustably select an appropriate degree of vacuum.

When the packaging operation has been completed, the article 1, together with the base table 2, is carried on a suitable vehicle, such as a truck, for the purpose of transportation. During transportation, the article 1, together with the base table 2, may be transported in a horizontal state or orientation in which the base table 2 is disposed downside. Alternatively, the article 1, together with the base table 2, may be transported in a vertical state or orientation in which the base table 2 is disposed vertically. Furthermore, the article 1, together with the base table 2, may be transported in a suspended manner or state in which the base table 2 is disposed upside in a substantially horizontal orientation. In any way, the article may be transported in a position in which it is most stable, or in a position by which it is most efficiently accommodated in a restricted space, such as the carrier of a truck.

In order to un-package the article 1, the gate valve 11 in the connection pipe 10 is simply opened. By this, atmospheric air is withdrawn through the connection pipe 10 into the space within the packaging sheet 3. Thus, the pressure in the space within the packaging sheet 3 is returned to the atmospheric pressure, whereby the article 1 will be released. Then, the packaging sheet 3 is removed from the base table 2 and the article 1. After the unpacking, the packaging sheet 3 is folded and placed on the base table 2.

It is possible for the connection pipe 10 to be mounted directly on the packaging sheet 3, rather than on the base table 2. In this case, the connection pipe 10 is provided at a portion of the packaging sheet 3 which is not in contact with the base table 2 and the article 1.

Figure 4:
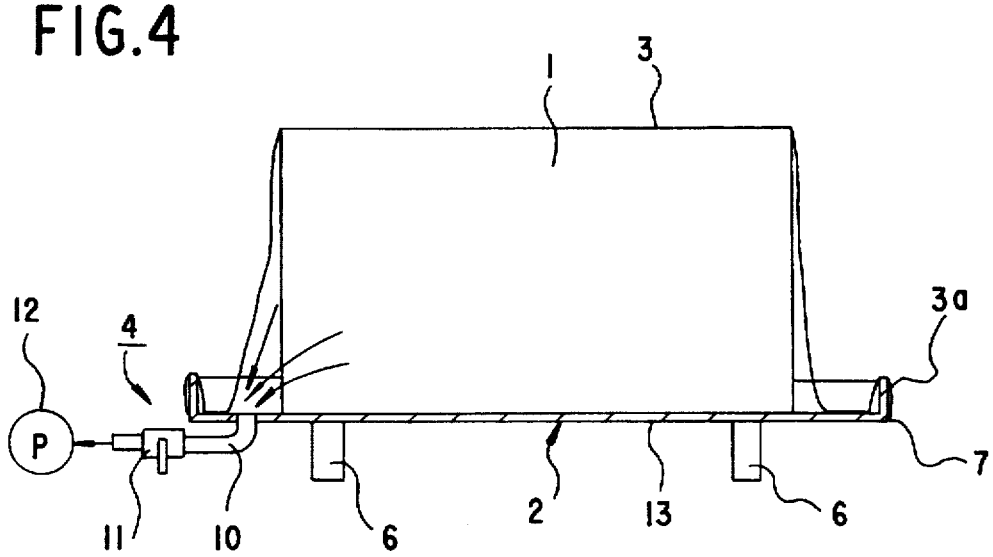
FIG. 4 is an elevational view, in section, of a packaging device according to another embodiment of the invention.

The base table 2 may be formed from a material of a plate-like member having a reduced thickness, as shown in FIG. 4. In this case, the base table 2 includes a bottom wall 13 and a peripheral wall 7 provided in the periphery of the bottom wall 13, the bottom wall 13 and the peripheral wall 7 being integrally formed in one piece.

Figure 5:
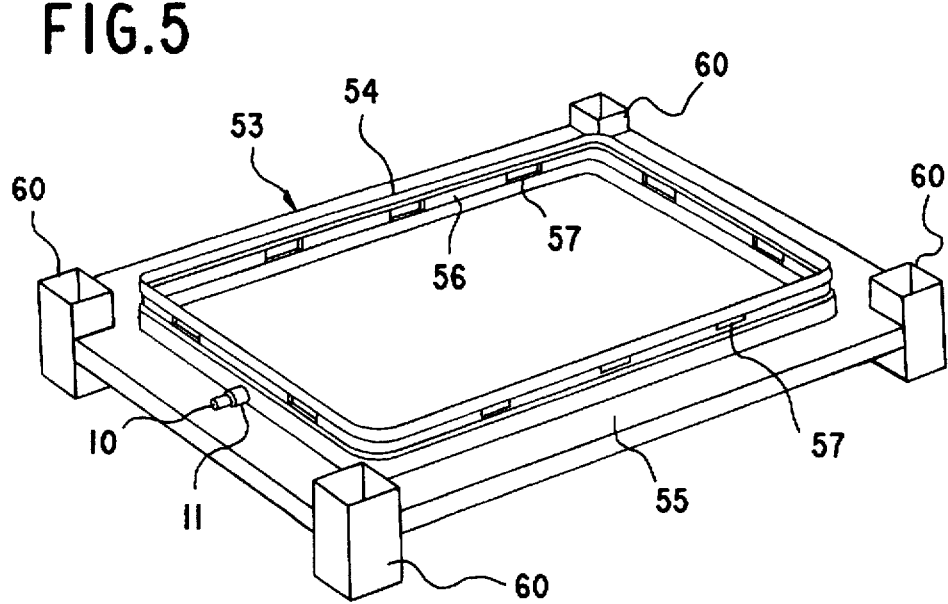
FIG. 5 is a perspective view illustrating a base table of a packaging device according to a further embodiment of the invention.
Figure 6:
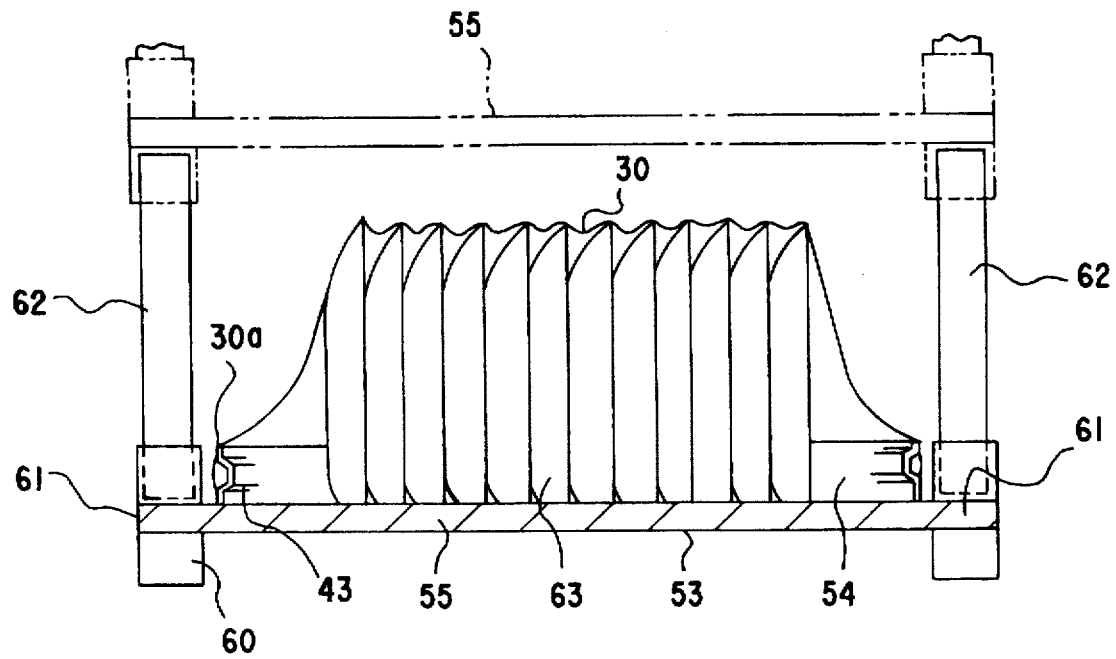
FIG. 6 is an elevational view, in section, of the packaging device of FIG. 5 in which a plurality of panel members are packaged.

FIGS. 5 and 6 illustrate a packaging device according to another embodiment of the invention. In this embodiment, the base table 53 includes a peripheral wall 54. The peripheral wall 54 consisting of four sides is disposed on a rigid support table 55. The peripheral wall 54 includes a groove 56 extending therearound. A plurality of suction ports 57 are formed in the groove 56. The suction ports 57 extend through the peripheral wall 54. The connection pipe 10 is disposed at an appropriate position, so as to be in communication with the interior of the peripheral wall 54. When the connection pipe 10 is connected to the vacuum pump (not shown), and the packaging sheet 30, at its peripheral portion, is fitted over the groove 56 of the peripheral wall 54, the peripheral portion of the packaging sheet 30 is sucked by the suction ports 57, so as to be fitted around the groove 56 in an airtight manner. The support table 55 is extended outwardly from the circumferential, continuous line defining the outer periphery of the peripheral wall 54. The portion of the upper surface of the support table 55 defined within the peripheral wall serves as an article carrying surface. The support table 55 carries, at each of the four corners, a retainer 60 for receiving a support column. Each retainer 60 for receiving a respective support column is formed with a bottom 61. Accordingly, a plurality of packaging devices may be stacked vertically, using support columns 62 of an appropriate length to be inserted in the retainers 60 for the support columns 62.

In the packaging device shown in FIG. 6, a plurality of panel members 63 are packaged within the packaging sheet 30. In this embodiment, the space within the packaging sheet 30 is also evacuated. By this, the packaging sheet 30 becomes to be tightly fitted over the panel members 63. Accordingly, the panels 63 are prevented from being falling down, and fixedly urged against the base table 53, by means of the atmospheric pressure.

In the thus formed package in which a plurality of panel members 63 are packaged within the packaging sheet 30, it is possible to remove at least one of the panel members 63 from the package, by depackaging the package. Then, the packaging sheet 30 is again placed over the remaining panel members 63, and thereafter the space within the packaging sheet 30 is evacuated. By this, the remaining panel members 63 may be easily and securely packaged within the packaging sheet 30, without displacing or repositioning the remaining panel members 63.

It is possible for the article 1 or panels 63, together with a quantity of gas absorber, to be packaged within the packaging sheet 3 or 30. In such a case, an evacuated condition may be maintained for a long period of time, and thus it is advantageous for a long-term preservation of the article or the like.

In the aforementioned embodiment, the base table 2 and the carrier of transportation means such as a truck are explained as different things. It is noted, however, that the base table 2 per se may constitute the carrier of the transportation means, according to the invention.

Figure 7:
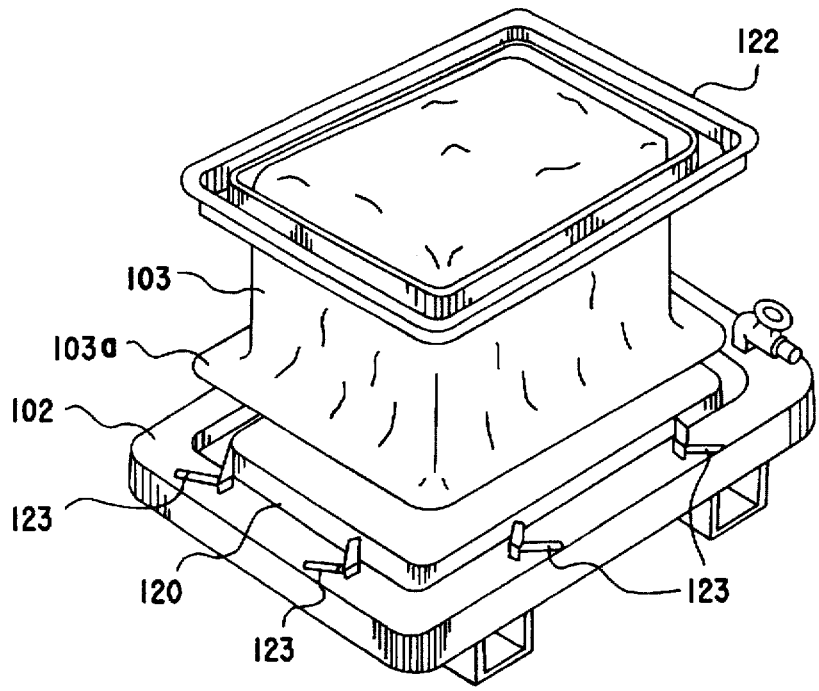
FIG. 7 is a perspective view illustrating a load carrying surface of transportation means.
Figure 8:
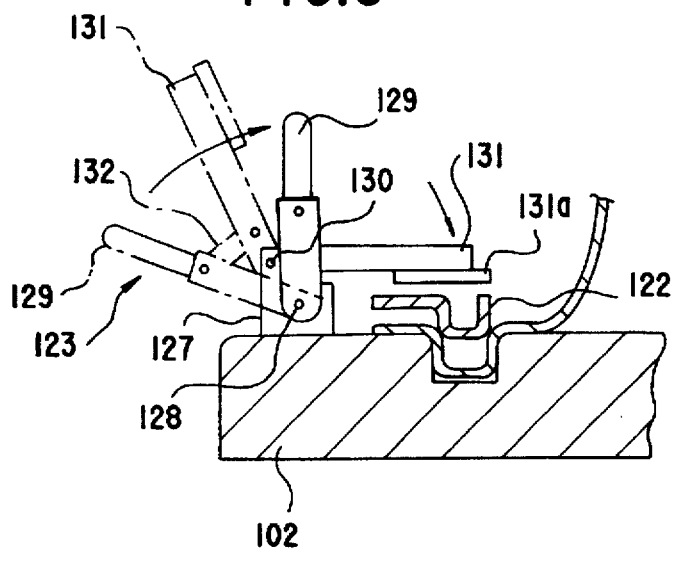
FIG. 8 is a side elevational view showing a method in which an opening of a packaging sheet is securely closed.
Figure 9:
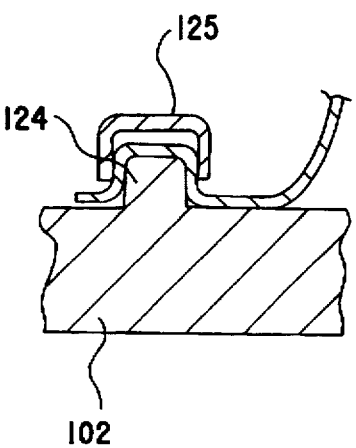
FIG. 9 is a side elevational view showing another method in which an opening of the packaging sheet is securely closed.
Figure 10:
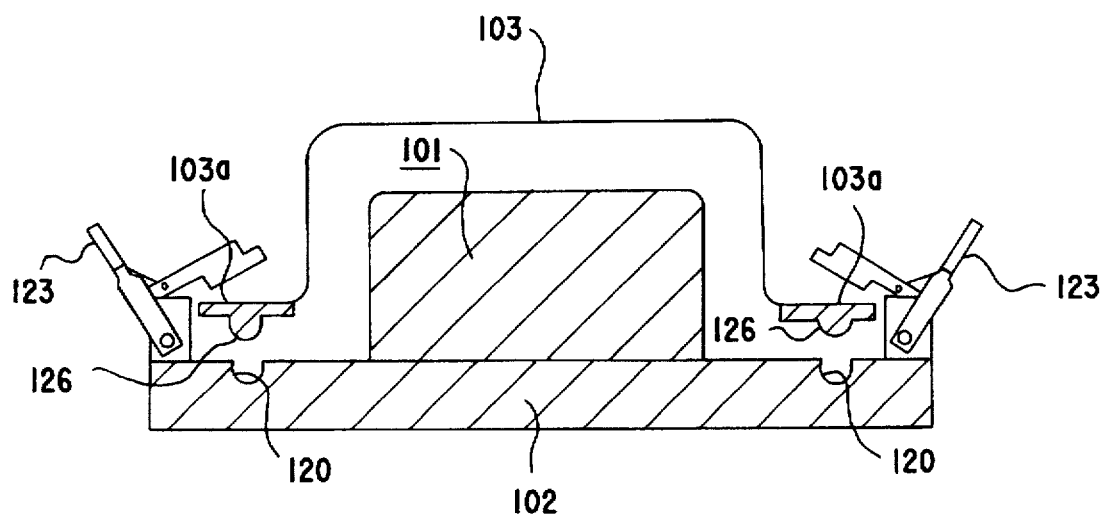
FIGS. 10 and 11 are side elevational views of a load carrying surface illustrating a further method in which an opening of a packaging sheet is securely closed.
Figure 11:
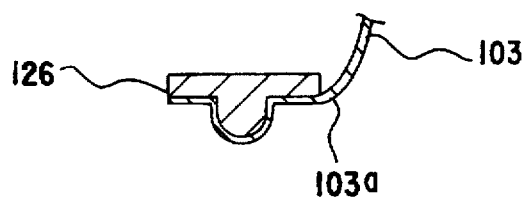

As shown in FIGS. 7 and 8, an open end 103a of a packaging sheet 103 may be securely attached to a base table 102 in an airtight manner in the following preferable procedure. The open end 103a of the packaging sheet 103 is placed over an annular groove 102 formed in the load carrying surface along its periphery in the upper surface of the base table 102. A presser ring 122 is placed around the open end 103a of the packaging sheet 103. The presser ring 122 is of an annular configuration (rectangular in the illustrated embodiment) corresponding to the circumferential configuration of the groove 120. The presser ring 122 is adapted to be resiliently fitted in the groove 120. The presser ring 122 is urged downwardly, by its upper surface, by a plurality of clamps 123 disposed substantially equidistantly along the periphery of the groove 120. By this, the peripheral portion around the open end 103a of the packaging sheet 103, together with the presser ring 122, is pressingly fitted in the groove 120. In this connection, it is possible to form an annular protrusion 124, instead of the groove 120, along the periphery of the load carrying surface in the upper surface of the base table 102. In this case, a rectangular pressor ring 125 is used in place of the above pressor ring 122. The rectangular pressor ring 125 has a cross-section of an inverted, substantially U-shaped configuration and is adapted to be resiliently fitted over the annular protrusion 124. In the above embodiment, the pressor ring 122 or 125 is formed independently of the packaging sheet 103. It is noted, however, that a pressor ring 126 adapted to be resiliently fitted in the groove 120 may be formed integrally with the open end 103a of the packaging sheet 103 in its inner surface, as shown in FIG. 10, or formed integrally with the open end 103a of the packaging sheet 103 in its outer surface, as shown in FIG. 11. Preferably, the pressor rings 122, 125 and 126 are formed from a material, such as steel, having an appropriate stiffness and toughness, which is capable of transmitting each pressure action, exerted by the plurality of clamps 123 over a predetermined length, to the open end 103a. A packing or sealing material may be placed between the base table 102, the open end 103a of the packaging sheet and the pressor ring 122, 125 or 126, as desired, so as to increase air-tightness.

The clamp 123 includes, as shown in FIG. 8, a first lever 129 pivotable about a pin 128 of a bracket 127 fixed to the base table 102, a second lever 131 pivotable about a pin 130, and a link plate 132 connecting the first lever 129 and the second lever 131 at their intermediate portions for pivotable movement. When the first lever 129 is raised in the direction of the arrow mark, the second lever 131 is urged by the link plate 132 into a horizontal position. Thus, a pressure portion 131a at the forward end of the second lever 131 applies a pressure on the pressor ring 122, 125 or 126.

The invention has been explained in the above with reference to the preferred embodiments. The invention may be applicable, not to mention a truck or a railroad freight car, to substantially all transportation means, such as a small marine boat having a deck on which a relatively small load is fixedly maintained.

In accordance with the invention, an article is packaged utilizing the atmospheric pressure. Thus, no additional means for fixedly maintaining or binding the article is not required in substance. The number of parts constituting the packaging device is minimized. The weight of the packaging device may be substantially reduced, as compared with prior art packaging device. Packaging operation may be conducted in simple and quick manner, by placing a packaging sheet on an article, so as to place peripheral edge of the packaging sheet sealingly attached to the base table, thereafter evacuating a space within the packaging sheet by means of a vacuum pump. Depackaging operation may be also conducted in a very simple manner, by opening vacuum connection means, so as to introduce the atmospheric pressure into the space within the packaging sheet.

The packaging sheet covers the article completely in an airtight manner. This contributes to improvement in moisture-proofing and dust-proofing property of the package. The space in which the article is accommodated is substantially evacuated. Thus, the space is maintained in oxygen-poor condition, so that an ideal environment is maintained for the purpose of restricting metal articles from rusting. The packaged article is uniformly acted on by the atmospheric pressure, so that a plurality of articles, rather than a single article, may be packaged at the same time. It is unnecessary for each article to be bound. Accordingly, the article would not be damaged at a limited area, as in the case of prior art using binding means, so that superior fixation function may be obtained.

When a plurality of articles are packaged, a particular article may be removed from the package, by releasing the packaging sheet. The packaging sheet may be placed again on the remaining articles. The space within the packaging sheet is then evacuated, so that the remaining articles may be packaged again. Specifically, any desired article or articles may be removed from the package without depackaging it in its entirety, and the remaining articles may be simply packaged again by placing the packaging sheet on the remaining articles and evacuating the space within the packaging sheet.

In a packaging device including a base table of a hollow construction, or a base table constructed with a bottom wall and a peripheral wall, the weight may be reduced significantly. With the base table formed with suction ports, the peripheral edge of the packaging sheet is sealingly sucked to the base table, so that stable evacuation may be conducted during packaging.

It is also possible to use a packaging sheet having a peripheral edge of an increased thickness, or a packaging sheet having binding means on the outer periphery thereof. Such packaging sheets increase air-tightness between the packaging sheet and the base table, as well as stability in evacuation during packaging operation. When the packaging sheet is adhesively attached to the base table, it is possible for the packaging sheet to be bonded to or removed from the base table upon packaging or depackaging, so that increased workability or working property may be achieved.

I claim:

1. A device for packaging an article utilizing atmospheric pressure, comprising:

a base table having a surface for carrying the article, a bottom wall, a peripheral wall upstanding from said bottom wall, and a solid support table extending outwardly from said peripheral wall;

a packaging sheet having flexibility and air-tightness for packaging therein said article on said base table and for being fixed to said base table in an airtight manner;

connection means adapted to be in communication with a vacuum source for reducing the pressure in a space within said packaging sheet to a pressure below the atmospheric pressure;

said peripheral wall of said base table being formed with a groove extending around said peripheral wall in its entirety, said groove being formed by recessing a portion of said peripheral wall;

a plurality of support columns;

said support table having, at each of its four corners, an upstanding retainer for receiving one of said plurality of support columns, each of said retainers receiving said support column inserted therein, whereby said support table having said article mounted thereon may be stacked in a vertical direction;

said peripheral wall of said base table being formed with suction ports for sucking said peripheral edge of said packaging sheet thereto;

said suction ports in said peripheral wall of said base table being formed in said groove.

2. A packaging device for packaging an article utilizing atmospheric pressure, comprising:

a base table having a surface for carrying the article;

a packaging sheet having flexibility and air-tightness for packaging therein said article on said base table and for being fixed to said base table in an airtight manner;

connection means adapted to be in communication with a vacuum source for reducing the pressure in a space within said packaging sheet to a pressure below the atmospheric pressure; and tightening means for fixings aid packaging sheet to said base table adapted to be placed on the peripheral edge of said packaging sheet, said packaging sheet being sealingly engaged with said base table.

3. A packaging device utilizing atmospheric pressure according to claim 2, wherein said surface of said base table is formed with a groove extending in its entirety around an area where said article is to be positioned, said groove being formed by recessing a portion of said surface; and said peripheral edge of said packaging sheet is formed with an increased thickness having a cross-sectional configuration corresponding to that of said groove formed in said surface of said base table, said edge of increased thickness being sealingly engaged with said groove by said tightening means.

4. A packaging device for packaging an article utilizing atmospheric pressure, comprising:

a base table having a surface for carrying the article;

a packaging sheet having flexibility and air-tightness for packaging therein said article on said base table and for being fixed to said base table in an airtight manner;

connection means adapted to be in communication with a vacuum source for reducing the pressure in a space within said packaging sheet to a pressure below the atmospheric pressure;

said surface of said base table being formed with a groove extending in its entirety around an area where said article is to be positioned, said groove being formed by recessing a portion of said surface; and tightening means for fixing said packaging sheet to said base table having a cross-section corresponding to the cross-sectional configuration of said groove, said tightening means being placed on the peripheral edge of said packaging sheet, said packaging sheet being sealingly engaged with said base table.

* * * * *